Patented Oct. 8, 1946

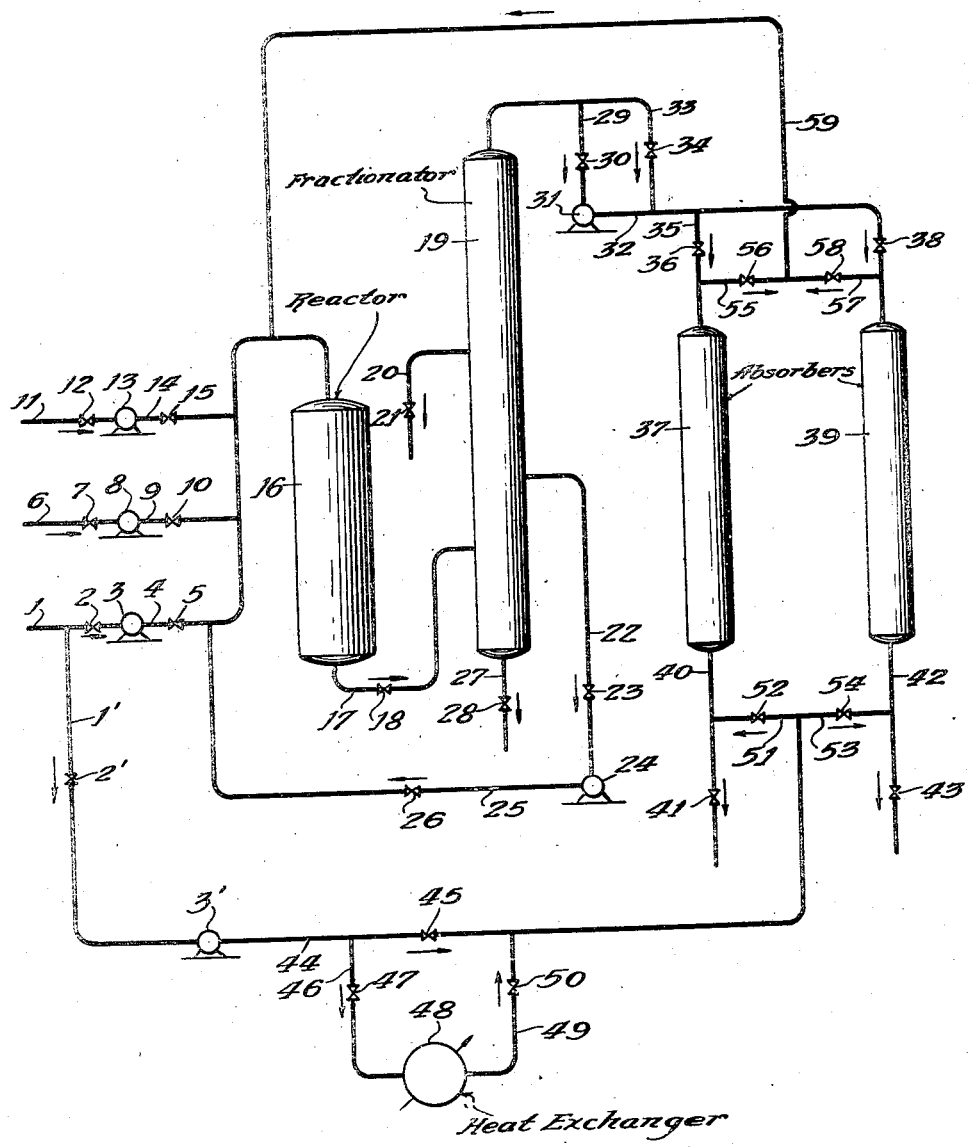

2,408,950

UNITED STATES PATENT OFFICE 2,408,950

TREATMENT OF HYDROCARBONS

Herman Pines and Herman S. Bloch, Riverside, Ill., assignors to Universal Oil Products Company, Chicago, Ill., a corporation of Delaware Application October 26, 1944, Serial No. 560,367

5 Claims. (Cl. 260—683.4)

1

This invention relates to improvements in hydrocarbon conversion processes wherein metallic halides and hydrogen halides are utilized as catalytic agents. More specifically, it is concerned with a method of separating the hydrogen halides from the light gaseous products of the reaction so that they may be recycled to the conversion zone.

There are various hydrocarbon conversion processes in which metallic halides, particularly metallic bromides and chlorides, and hydrogen halides such as hydrogen bromide and hydrogen chloride are used as catalytic agents. For example, aluminum chloride is used in conjunction with hydrogen chloride as a catalyst for the alkylation of isoparaffins or aromatics with olefins, cracking of hydrocarbons, isomerization of paraffins and in the conversion of propane to heavier hydrocarbons. The recovery of the hydrogen chloride from the gaseous products formed in the above referred to processes presents a particularly difficult problem, the solution of which determines in most instances the commercial feasibility of the process.

Ordinarily, in most of the previously mentioned hydrocarbon conversion processes, relatively small amounts of gases such as hydrogen, methane and ethane are formed during the conversion process. The presence of these light hydrocarbons prevents the separation of the hydrogen halide from the reaction products by a simple distillation or flashing operation. The removal of these light hydrocarbons from the recycled hydrogen halide stream is essential to prevent an accumulation of such hydrocarbons in the reaction zone.

It is an object of the present invention to provide a method for separating the hydrogen halides from the light gaseous hydrocarbons so that a hydrogen halide substantially free from hydrocarbons may be recovered and recirculated to the conversion zone. The particular method disclosed herein generally consists of passing a mixture of light gaseous hydrocarbons and hydrogen halide through an adsorber containing a suitable granular solid which selectively adsorbs the hydrogen halide from the mixture. The actual adsorption reaction may take place within a temperature range of about 0 to about 210° F. and under a pressure between about 50 and 2000 pounds per square inch. This adsorption operation will be described subsequently in more detail.

The invention disclosed herein is not only adaptable to such processes wherein metallic halides and hydrogen halides are utilized as catalytic agents, but is applicable to any process wherein hydrogen halide is used or formed during the reaction and must be separated from other gaseous products.

In one specific embodiment, the present invention relates to a hydrocarbon conversion process which comprises subjecting said hydrocarbon to conversion with a metallic halide catalyst in the presence of a hydrogen halide, separating from the conversion products a gas mixture containing hydrogen halide, subjecting said gas mixture to contact with a solid adsorbent to separate the hydrogen halide from the mixture by adsorption thereof in the solid adsorbent, desorbing hydrogen halide from the solid adsorbent and supplying said hydrogen halide to the first mentioned conversion step.

The essential features of the operation are more fully explained in a description of the accompanying diagrammatic drawing which illustrates in conventional side elevation one type of apparatus in which the objects of this invention may be accomplished.

For simplification the description of the drawing will be directed to the isomerization of normal butane into isobutane in the presence of aluminum chloride, hydrogen chloride and hydrogen, although it is understood that the broad scope of the present invention is applicable to other processes in which hydrogen halide is present in the reaction zone. A few typical reactions in which the feature of the present invention are particularly applicable have been hereinbefore enumerated.

Referring to the drawing, normal butane may be introduced through line 1 containing valve 2 to pump or compressor 3 which discharges through line 4 containing valve 5. Simultaneously hydrogen may be introduced through line 6 containing valve 7 to compressor 8 which discharges through line 9 and valve 10 into line 4, already mentioned, while hydrogen chloride may be admitted through line 11 containing valve 12 to compressor 13 which discharges through line 14 and valve 15 to line 4 through which the commingled mixture of normal butane, hydrogen and hydrogen chloride may be conducted to isomerizing reactor 16, although more than one isomerizing reactor may be employed, if desired. Alternatively hydrogen chloride may be charged in the form of a solution in n-butane, if desired, or it may be introduced under pressure from any suitable source. Isomerizing reactor 16 may consist of a chamber containing a granular catalyst comprising essentially aluminum chloride or a mixture of aluminum chloride and another metal halide deposited upon a substantially inert carrier. This isomerizing treatment may be effected at a temperature within the approximate limits of 100° and 650° F. under a pressure at some point in the range of substantially atmospheric to approximately 3000 pounds per square inch.

Thus isomerizing reactor 16 may contain a granular catalytic material which is relatively non-volatile under the conditions of use and which in the presence of hydrogen chloride is capable of producing a substantial degree of isomerization of normal butane to isobutane.

From reactor 16 a mixture comprising essentially isobutane, unconverted normal butane, hydrogen, hydrogen chloride, and a relatively small amount of decomposition products including propane and lighter hydrocarbons may be conducted through line 17 and valve 18 to fractionator 19 of conventional design to separate therefrom a fraction comprising essentially ethane and lighter gases, isobutane alone or admixed with a relatively small amount of propane, normal butane, and a mixture of pentanes and higher hydrocarbons. Said isobutane, or isobutane mixed with small amounts of propane, may be withdrawn from fractionator 19 through line 20 containing valve 21 to cooling and storage, not shown in the diagrammatic drawing. Normal butane separated in fractionator 19 may be conducted therefrom through line 22 and valve 23 to pump or compressor 24 which discharges through line 25 and valve 26 into line 4, already mentioned, through which normal butane is being conducted to isomerization. Pentanes and higher hydrocarbons may be withdrawn from the lower portion of fractionator 19 through line 27 and valve 28 to storage.

Light gases comprising essentially hydrogen, hydrogen chloride, ethane, and methane may be directed from near the top of fractionator 19 through line 29 and valve 30 to compressor 31 which discharges through line 32, through branch line 33 and valve 36 to adsorber 37. It is within the scope of the invention to by-pass compressor 31 and supply the light gas stream through line 33 and valve 34 to adsorber 37. The adsorbers may be cooled by means not shown to maintain a temperature between about 0° and about 210° F. or more while they are operated under a pressure within the approximate range of 50 to 2000 pounds per square inch.

The adsorption system, as shown in the drawing, comprises two units, adsorbing tower 37 and adsorbing tower 39, which alternately adsorb and desorb the hydrogen chloride. However, a larger number may be employed if desired and either single or multiple units may be used in conjunction with each other either in parallel or series flow. Adsorbing towers 37 and 39 are packed with suitable granular solid adsorbents which comprise such substances as dry charcoal of either animal or vegetable origin, similar activated chars derived from petroleum coke, calcined Activated Alumina, calcined silica gel, calcined diatomaceous earth, or any active and porous earth or clay which has been calcined to a temperature sufficient to eliminate a high proportion of moisture.

The adsorbers are so arranged that one may be in use for adsorbing hydrogen chloride from said light gases while the other is being desorbed of hydrogen chloride which has accumulated upon the adsorbent in a prior adsorbing treatment of the effluent light gases. Thus if the light gases from fractionator 19 are being pumped into adsorber 37, valves 38, 43, 52 and 56 are shut so that the gases pass through line 35 and valve 36 into adsorber 37 and therefrom the hydrogen chloride-free gases pass through line 40 and valve 41 to waste or to other use, while the hydrogen chloride remains adsorbed by the granular filler in adsorber 37.

Simultaneously hydrogen chloride previously adsorbed by the granular material in adsorber 39 is being desorbed.

In the preferred embodiment of the invention this desorption is effected by means of a portion of the charging stock to the isomerization process. In the case here illustrated, a portion of the normal butane feed may be diverted from line 1 through line 1', valve 2', pump 3', line 44 and all or in part through valve 45 or through line 46, valve 47, heat exchanger 48, line 49 and valve 50 into line 53 and thence through valve 54 and line 42 to adsorber 39 to strip the hydrogen chloride from the adsorbent. It is also within the scope of the invention to desorb the hydrogen chloride from the adsorbent by dissolving the hydrogen chloride in liquified butane. Although not illustrated in the drawing, it is within the scope of the invention to pass the liquified butane downwardly through the adsorber.

When using upflow in the desorption step, the mixture of butane and hydrogen chloride is removed from the upper portion of adsorber 39 through line 32 and is directed through line 57, valve 58, line 59 into line 4 and thereby returned to reactor 16. It is understood that when downflow is used in the desorption step, the mixture of butane and hydrogen chloride may be removed from the lower portion of adsorber 39 and recycled to the reactor by well-known means not illustrated.

When the hydrogen chloride has been desorbed sufficiently from the adsorbent in adsorber 39 and the adsorbent in zone 37 has become substantially saturated with hydrogen chloride, valves 36, 41, 54 and 58 are closed, and valves 38, 43, 52 and 56 are opened. The hydrogen chloride-containing gases are then directed into tower 39, while the normal butane is introduced into tower 37 through line 51, valve 52 and line 40, and the mixture of hydrocarbon and hydrogen chloride are supplied from the upper portion of zone 37, through line 55, valve 56, line 59 and line 4 to the reactor.

While the use of a portion of the butane charging stock is preferred in effecting the desorption treatment, it is also within the scope of the invention to effect desorption of the hydrogen chloride by means of gases other than hydrocarbons which are also used in the reaction. These gases are preferably heated and then utilized to effect the desorption, although in some cases the gases may be used in a liquified condition provided the hydrogen chloride is sufficiently soluble therein.

For simplification, the description of the process has been limited to the use of towers containing static beds of solid granular adsorbents. However, the process is also adaptable to the use of a powdered adsorbent maintained in a fluid state by suspension of said powdered adsorbent in the hydrogen halide containing gaseous mixture. In this method of utilization the apparatus would comprise two sections, the adsorption and stripping towers with appropriate settling and precipitating means to separate the powdered adsorbent from the gases.

The following example is introduced to show results normally expected in the operation of the process, although with no intention of unduly limiting the generally broad scope of the invention.

*Example*

A mixture containing 84.5 molecular proportions of normal butane, 12.4 molecular proportions of anhydrous hydrogen chloride, and 3.1 molecular proportions of hydrogen is passed at 390° F. under a pressure of 650 pounds per square inch through a reactor containing a composite of 37.6% by weight of substantially anhydrous aluminum chloride and 62.4% by weight of activated cocoanut charcoal in the form of 4-10 mesh granules. When the normal butane is charged as liquid at a rate corresponding to a liquid space velocity of 1, the reaction products consist of hydrogen and hydrogen chloride originally charged and a hydrocarbon mixture comprising essentially 0.4% by volume of methane, 0.2% ethane, 2.3% propane, 46.0% isobutane, 49.4% unconverted normal butane, and 1.7% pentane. Fractional distillation of said reaction product substantially separates propane and higher hydrocarbons from a light gas mixture with approximately the following volume per cent composition: methane, 2.0%, ethane, 1.0%; propane, 1.5%; hydrogen, 19.2%; and hydrogen chloride 76.3%.

This light gas mixture is passed through an adsorbing tower containing activated cocoanut charcoal at an hourly rate corresponding to a gaseous space velocity of 2000 at 75° F. and under a pressure of 700 lbs. per square inch. Under these conditions approximately 95% of the hydrogen chloride is adsorbed therefrom by the charcoal. After passage of approximately 1000 volumes of said light gas mixture through one volume of adsorbent, the removal of hydrogen chloride becomes less complete. The stream of light gas mixture is then stopped. The hydrogen chloride present in the adsorbing tower is removed in solution with normal butane which is introduced at a temperature of about 74° F. under a pressure of approximately 210-lb. gauge and at a rate equivalent to a liquid space velocity of approximately 0.25 (volumes of liquid butane per volume of solid adsorbent per hour). The butane leaving the adsorbing tower contains approximately 20 mol per cent of hydrogen chloride, and may be supplied to the isomerization step for conversion therein.

The character of the present invention and its commercial value are evident from the foregoing specification and examples, although the proper scope of the invention is not limited to exact correspondence with the descriptive and numerical material presented.

This application is a continuation-in-part of our co-pending application Serial No. 455,509, filed August 20, 1942, which is in turn a continuation of application Serial No. 360,906, filed October 12, 1940, now Patent #2,300,235.

We claim as our invention:

1. In the conversion of hydrocarbons wherein the hydrocarbon charging stock is converted in a reaction zone in the presence of a hydrogen halide, the method which comprises separating from the products of the conversion step a gas mixture containing hydrogen halide and normally gaseous hydrocarbons, contacting said gas mixture with a solid adsorbent to separate hydrogen halide from the mixture by adsorption thereof in the solid adsorbent, subsequently contacting the solid adsorbent with at least a portion of said charging stock in liquid phase to dissolve adsorbed hydrogen halide in said liquid portion of the charging stock, and supplying the resultant hydrogen halide-containing charging stock to said reaction zone.

2. The method as defined in claim 1 further characterized in that said hydrogen halide is hydrogen chloride.

3. The method as defined in claim 1 further characterized in that said charging stock comprises a normal paraffin which is isomerized in the reaction zone.

4. In the conversion of normal butane to isobutane wherein the normal butane is isomerized in a reaction zone in the presence of hydrogen chloride, the method which comprises separating from the products of the conversion step a gas mixture containing hydrogen chloride and normally gaseous hydrocarbons, contacting said gas mixture with a solid adsorbent to separate hydrogen chloride from the mixture by adsorption thereof in the solid adsorbent, subsequently contacting the solid adsorbent with liquid normal butane to dissolve adsorbed hydrogen chloride in the liquid butane, and supplying the resultant mixture of normal butane and hydrogen chloride to said reaction zone.

5. In an alkylation process wherein an isoparaffin is reacted with an olefin in a reaction zone in the presence of a hydrogen halide, the method which comprises separating from the products of the conversion step a gas mixture containing hydrogen halide and normally gaseous hydrocarbons, contacting said gas mixture with a solid adsorbent to separate hydrogen halide from the mixture by adsorption thereof in the solid adsorbent, subsequently contacting the solid adsorbent with an isoparaffinic liquid to dissolve adsorbed hydrogen halide in said liquid, and supplying the resultant solution to said reaction zone.

HERMAN PINES.
HERMAN S. BLOCH.